(12) United States Patent
Zhang et al.

(10) Patent No.: US 11,238,301 B2
(45) Date of Patent: Feb. 1, 2022

(54) COMPUTER-IMPLEMENTED METHOD OF DETECTING FOREIGN OBJECT ON BACKGROUND OBJECT IN AN IMAGE, APPARATUS FOR DETECTING FOREIGN OBJECT ON BACKGROUND OBJECT IN AN IMAGE, AND COMPUTER-PROGRAM PRODUCT

(71) Applicant: BOE Technology Group Co., Ltd., Beijing (CN)

(72) Inventors: Huanhuan Zhang, Beijing (CN); Jingtao Xu, Beijing (CN); Xiaojun Tang, Beijing (CN); Hui Li, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/960,052

(22) PCT Filed: May 9, 2019

(86) PCT No.: PCT/CN2019/086221
§ 371 (c)(1),
(2) Date: Jul. 3, 2020

(87) PCT Pub. No.: WO2020/223963
PCT Pub. Date: Nov. 12, 2020

(65) Prior Publication Data
US 2021/0256291 A1 Aug. 19, 2021

(51) Int. Cl.
*G06K 9/46* (2006.01)
*G06T 7/11* (2017.01)
(Continued)

(52) U.S. Cl.
CPC ......... *G06K 9/4652* (2013.01); *G06K 9/3233* (2013.01); *G06K 9/6256* (2013.01);
(Continued)

(58) Field of Classification Search
CPC .. G06K 9/4652; G06K 9/6256; G06K 9/3233; G06T 7/11; G06T 7/90; G06T 2207/20081
See application file for complete search history.

(56) References Cited

U.S. PATENT DOCUMENTS

| | | | |
|---|---|---|---|
| 6,563,324 B1* | 5/2003 | Nichani | G06T 7/001 |
| | | | 324/537 |
| 2007/0133860 A1* | 6/2007 | Lin | G06T 7/001 |
| | | | 382/149 |

(Continued)

FOREIGN PATENT DOCUMENTS

| | | |
|---|---|---|
| CN | 106227215 A | 12/2016 |
| CN | 106408605 A | 2/2017 |

(Continued)

OTHER PUBLICATIONS

International Search Report & Written Opinion dated Jan. 23, 2020, regarding PCT/CN2019/086221.

(Continued)

*Primary Examiner* — Nay A Maung
*Assistant Examiner* — Nicolas James Boyajian
(74) *Attorney, Agent, or Firm* — Intellectual Valley Law, P.C.

(57) ABSTRACT

A computer-implemented method of detecting a foreign object on a background object in an image is provided. The computer-implemented method includes extracting image features of the image based on image characteristics of the background object and a suspected foreign object; detecting a salient region in the image based on a human visual (Continued)

attention model; generating a salient region mask based on detection of the salient region; obtaining the image features in a region surrounded by the salient region mask; perforating feature combination and feature vector length normalization on the image features of the region surrounded by the salient region mask to generate normalized feature vectors; and identifying the suspected foreign object using an image classifier, wherein the image classifier uses the normalized feature vectors as input for identifying the suspected foreign object.

16 Claims, 6 Drawing Sheets

(51) Int. Cl.
   *G06T 7/90* (2017.01)
   *G06K 9/32* (2006.01)
   *G06K 9/62* (2006.01)
   *G06T 7/60* (2017.01)
(52) U.S. Cl.
   CPC .............. *G06K 9/6267* (2013.01); *G06T 7/11* (2017.01); *G06T 7/60* (2013.01); *G06T 7/90* (2017.01); *G06T 2207/20081* (2013.01)

(56) References Cited

U.S. PATENT DOCUMENTS

| | | | |
|---|---|---|---|
| 2013/0034293 A1* | 2/2013 | Xu ......................... | G06T 7/001 |
| | | | 382/141 |
| 2015/0228063 A1* | 8/2015 | Minakawa ............... | G06K 9/52 |
| | | | 382/151 |
| 2017/0091671 A1* | 3/2017 | Mitarai ................. | G06F 16/285 |
| 2019/0354772 A1* | 11/2019 | Tasli .................... | G06K 9/4623 |

FOREIGN PATENT DOCUMENTS

| | | |
|---|---|---|
| CN | 107241062 A | 10/2017 |
| CN | 108549309 A | 9/2018 |
| CN | 108764202 A | 11/2018 |
| JP | 2016205910 A | 12/2016 |

OTHER PUBLICATIONS

Dang, "Research on the Algorithm for Detection and Recognition of Foreign Object Debris in Airport Runway", Chinese Mater's Theses Full-text Database Engineering Science and Technology I, 15, Feb. 2019, ISSN: 1674-0246.

* cited by examiner generating a salient region mask based on detection of the salient region

obtaining the image features in a region surrounded by the salient region mask

performing feature combination on the image features of the region surrounded by the salient region mask to generate one-dimensional feature vectors

performing feature vector length normalization on the one-dimensional feature vectors to generate normalized feature vectors

FIG. 6

COMPUTER-IMPLEMENTED METHOD OF DETECTING FOREIGN OBJECT ON BACKGROUND OBJECT IN AN IMAGE, APPARATUS FOR DETECTING FOREIGN OBJECT ON BACKGROUND OBJECT IN AN IMAGE, AND COMPUTER-PROGRAM PRODUCT

CROSS-REFERENCE TO RELATED APPLICATION

This application is a national stage application under 35 U.S.C. § 371 of International Application No. PCT/CN2019/086221, filed May 9, 2019, the contents of which are incorporated by reference in the entirety.

TECHNICAL FIELD

The present invention relates to image processing technology, more particularly, to a computer-implemented method of detecting a foreign object on a background object in an image, an apparatus for detecting a foreign object on a background object in an image, and a computer-program product.

BACKGROUND in many scenarios, foreign object detection is helpful for performing or planning a task. For example, solar panels are often contaminated by foreign objects such as bird droppings and tree leaves. Due to the large surface area of solar panels in a solar panel farm, targeted cleaning of contaminated areas of the solar panels can be very difficult. Automatic foreign object detection in an image of the solar panels can facilitate the cleaning of the solar panel, specifically targeting those contaminated areas. In another example, foreign objects on a mask plate used in semiconductor fabrication can adversely affect the quality of the device fabricated. Thus, targeted cleaning of the mask plate would greatly benefit the fabrication process.

SUMMARY

In one aspect, the present invention provides a computer-implemented method of detecting a foreign object on a background object in an image, comprising extracting image features of the image based on image characteristics of the background object and a suspected foreign object; detecting a salient region in the image based on a human visual attention model; generating a salient region mask based on detection of the salient region; obtaining the image features in a region surrounded by the salient region mask; performing feature combination and feature vector length normalization on the image features of the region surrounded by the salient region mask to generate normalized feature vectors; and identifying the suspected foreign object using an image classifier, wherein the image classifier uses the normalized feature vectors as input for identifying the suspected foreign object.

Optionally, the image features extracted from the image comprise features of a first type and features of a second type; performing feature combination on the image features comprises combining a respective one of the features of the first type and a respective one of the features of the second type into a respective one of the one-dimensional feature vectors.

Optionally, the features of the first type are hue features, and the features of the second type are local binary pattern (LBP) texture features.

Optionally, the computer-implemented method further comprises determining a color consistency of the region surrounded by the salient region mask.

Optionally, the computer-implemented method further comprises segmenting the salient region into a plurality of sub-regions, based on a determination that the color consistency of the region surrounded by the salient region mask is below a threshold value; and determining a contour of a refined salient region based on results of segmenting the salient region into the plurality of sub-regions.

Optionally, determining the color consistency comprises calculating variance of hue features of the region surrounded by the salient region mask; and determining whether the variance of the hue features is greater than a first threshold value; wherein the variance of the hue features being greater than the first threshold value indicates the color consistency of the region surrounded by the salient region mask being below a second threshold value.

Optionally, the computer-implemented method further comprises pre-training an initial image classifier to obtain the image classifier; wherein pre-training the initial image classifier comprises providing a training sample, a training classification label corresponding to the training sample, training image features corresponding to the training sample, and a training salient region mask corresponding to the training sample, the training image features comprising training features of a first type and training features of a second type; performing feature combination and feature vector length normalization on the training image features of the region surrounded by the training salient region mask to generate training normalized feature vectors; classifying the training sample based on the training normalized feature vectors to generate an initial classification label; determining a degree of match between the initial classification label and the training classification label; and tuning the initial image classifier based on the degree of match.

Optionally, pre-training the initial image classifier further comprises providing the training image having a training foreign object on a training background object; extracting training image features of the training image based on image characteristics of the training background object and the training foreign object; detecting a training salient region in the training image based on the human visual attention model; generating the training salient region mask based on detection of the training salient region; and obtaining the training image features in a region surrounded by the training salient region mask.

Optionally, the computer-implemented method further comprises outputting a classification label corresponding to the suspected foreign object and a relative location of the suspected foreign object on the background object.

Optionally, the background object is a photovoltaic panel.

In another aspect, the present invention provides an apparatus for detecting a foreign object on a background object in an image, comprising a memory; and one or more processors; wherein the memory and the one or more processors are connected with each other; and the memory stores computer-executable instructions for controlling the one or more processors to extract image features of the image based on image characteristics of the background object and a suspected foreign object; detect a salient region in the image based on a human visual attention model; generate a salient region mask based on detection of the salient region; obtain the image features in a region surrounded by the salient region mask; perform feature combination and feature vector length normalization on the image features of the region surrounded by the salient region mask to generate normalized feature vectors; and identify the suspected foreign object using an image classifier, wherein the image classifier uses the normalized feature vectors as input for identifying the suspected foreign object.

Optionally, the image features extracted from the image comprise features of a first type and features of a second type; wherein the memory stores computer-executable instructions for controlling the one or more processors to combine a respective one of the features of the first type and a respective one of the features of the second type into a respective one of the one-dimensional feature vectors.

Optionally, the features of the first type are hue features, and the features of the second type are local binary pattern (LBP) texture features.

Optionally, the memory further stores computer-executable instructions for controlling the one or more processors to determine a color consistency of the region surrounded by the salient region mask.

Optionally, the memory further stores computer-executable instructions for controlling the one or more processors to segment the salient region into a plurality of sub-regions, based on a determination that the color consistency of the region surrounded by the salient region mask is below a threshold value; and determine a contour of a refined salient region based on results of segmenting the salient region into the plurality of sub-regions.

Optionally, the memory further stores computer-executable instructions for controlling the one or more processors to calculate variance of hue features of the region surrounded by the salient region mask; and determine whether the variance of the hue features is greater than a first threshold value; wherein the variance of the hue features being greater than the first threshold value indicates the color consistency of the region surrounded by the salient region mask being below a second threshold value.

Optionally, the memory further stores computer-executable instructions for controlling the one or more processors to output a classification label corresponding to the suspected foreign object and a relative location of the suspected foreign object on the background object.

Optionally, the background object is a photovoltaic panel.

Optionally, the apparatus further comprises an image capturing device configured to obtain the image having the foreign object on the background object.

In another aspect, the present invention provides a computer-program product comprising a non-transitory tangible computer-readable medium having computer-readable instructions thereon, the computer-readable instructions being executable by a processor to cause the processor to perform extracting image features of an image based on image characteristics of a background object and a suspected foreign object in the image; detecting a salient region in the image based on a human visual attention model; generating a salient region mask based on detection of the salient region; obtaining the image features in a region surrounded by the salient region mask; performing feature combination and feature vector length normalization on the image features of the region surrounded by the salient region mask to generate normalized feature vectors; and identifying the suspected foreign object using an image classifier, wherein the image classifier uses the normalized feature vectors as input for identifying the suspected foreign object.

BRIEF DESCRIPTION OF THE FIGURES

The following drawings are merely examples for illustrative purposes according to various disclosed embodiments and are not intended to limit the scope of the present invention.

FIG. 6 is a flow chart illustrating a process of obtaining information regarding the salient region in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter cilia, a computer-implemented method of detecting a foreign object on a background object in an image, an apparatus for detecting a foreign object on a background object in an image, and a computer-program product that substantially obviate one or more of the problems due to limitations and disadvantages of the related art. In one aspect, the present disclosure provides a computer-implemented method of detecting a foreign object on a background object in an image. In some embodiments, the computer-implemented method includes extracting image features of the image based on image characteristics of the background object and a suspected foreign object; detecting a salient region in the image based on a human visual attention model; generating a salient region mask based on detection of the salient region; obtaining the image features in a region surrounded by the salient region mask; performing feature combination and feature vector length normalization on the image features of the region surrounded by the salient region mask to generate normalized feature vectors; and identifying the suspected foreign object using an image classifier; wherein the image classifier uses the normalized feature vectors as input for identifying the suspected foreign object.

Figure 1:
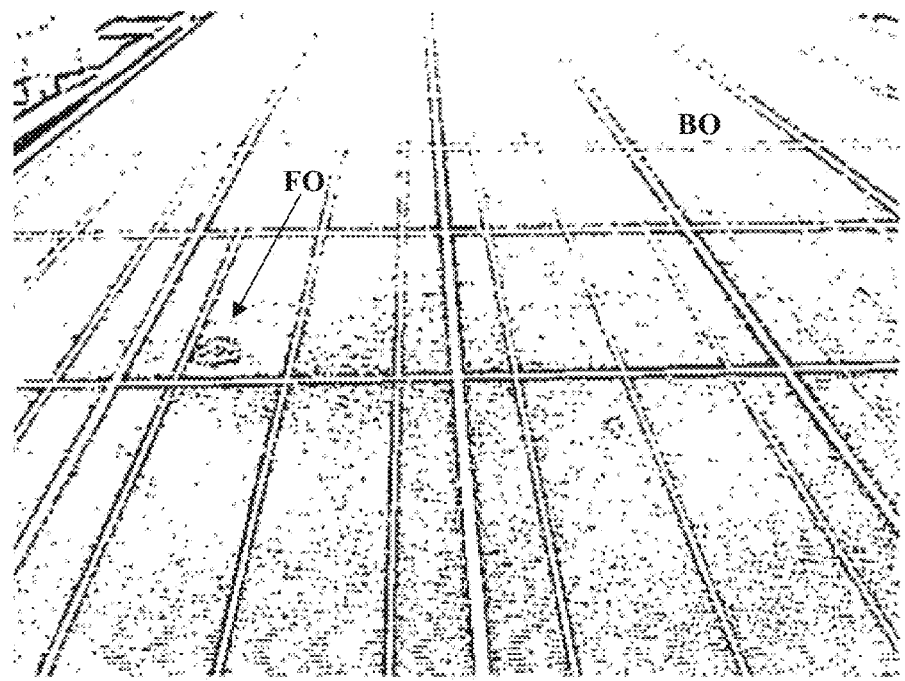
FIG. 1 is an image having a foreign object on a background object in some embodiments according to the present disclosure.
Figure 2:
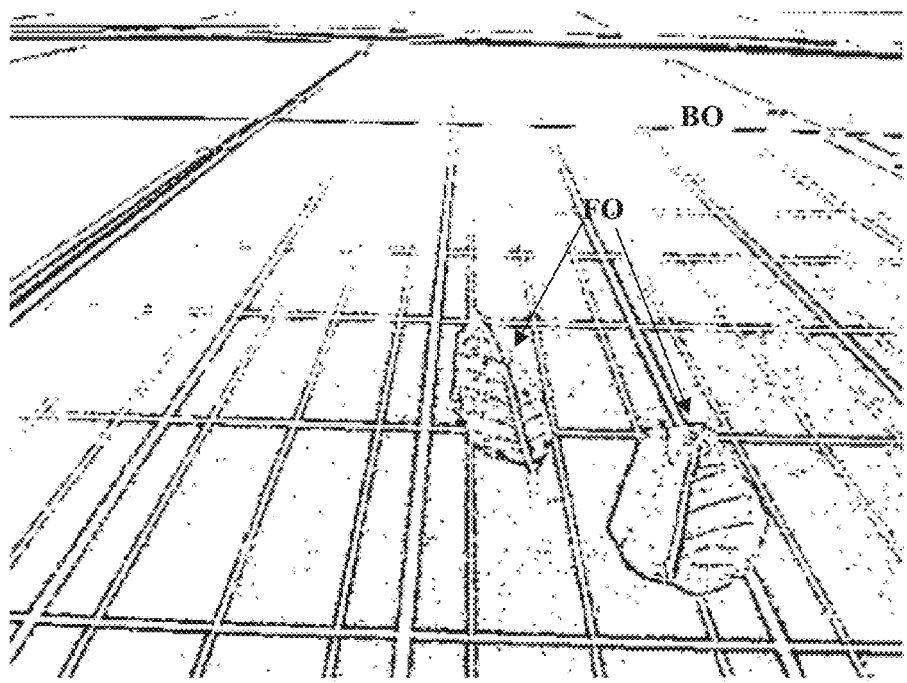
FIG. 2 is an image having a foreign object on a background object in some embodiments according to the present disclosure.

FIG. 1 is an image having a foreign object on a background object in some embodiments according to the present disclosure. FIG. 2 is an image having a foreign object on a background object in some embodiments according to the present disclosure. Referring to FIG. 1, the background object BO is a photovoltaic panel (solar panel) having a foreign object FO (e.g., a bird dropping) on the photovoltaic panel. Referring to FIG. 2, the background object BO is a photovoltaic panel having a foreign object FO (e.g.; a leaf) on the photovoltaic panel. The present method provides a novel algorithm for automatically identifying a foreign object FO and automatically classifying the foreign object FO into an object type in an image (e.g., a visible light image). The algorithm includes steps of detecting a salient region in the image and classifying the foreign object FO. The present method may be applied to detect a foreign object on a background object in complex scenarios. Examples of applications of the present method include detection of a foreign object on a photovoltaic panel, detecting a foreign object on a mask plate used in semiconductor fabrication, and target detection on the sea. For example, the uppermost layer of the photovoltaic panel is made of glass, and reflection and refraction of ambient light on the photovoltaic panel make foreign object detection a complex issue. The present method has been used in foreign object detection on the photovoltaic panel regardless of weather conditions and time of the day. The present method can work with any appropriate images, e.g., images captured using wide-angle lenses or normal lenses. Also, the present method can be used for foreign object detection in real-time and when the camera undergoes a motion relative to the background object (e.g., the photovoltaic panel).

Moreover, the present method enables automatic classification of the foreign object into an object type. The information on the object type can facilitate subsequent processes, e.g.; providing guidance on formulating a cleaning strategy for cleaning the photovoltaic panel. The information obtained by the present method can also be incorporated into a big data analysis.

Figure 3:
FIG. 3 illustrates image features and salient region masks of several exemplary images in some embodiments according to the present disclosure.

Various appropriate image features may be extracted based on image characteristics of the background object and a suspected foreign object. Examples of appropriate image features include hue features, local binary pattern (LBP) texture features, brightness features, and saturation features. FIG. 3 illustrates image features and salient region masks of several exemplary images in some embodiments according to the present disclosure. Referring to FIG. 3, exemplary images include images of two foreign objects (bird dropping and leaf) and a background object (photovoltaic panel without foreign object). As shown in FIG. 3, hue features and LBP texture features of the images can be extracted based on the image characteristics of the background object and the foreign object.

In some embodiments, the image can be converted into a plurality of color channels, e.g., a red color channel, a green color channel, and a blue color channel. Optionally, a respective image feature may be calculated as a mean of values from the plurality of color channels. For example; a brightness feature may be calculated as a mean of brightness values of the plurality of color channels.

In some embodiments, the LBP texture features may be calculated based on Equation (1):

$$LBP(x_c, y_c) = \sum_{p=1}^{8} s(I(p) - I(c)) * 2^p; \quad (1)$$

wherein $$s(x) = \begin{cases} 1, & x \geq 0 \\ 0, & \text{otherwise} \end{cases};$$

I(c) is the grayscale value of a target pixel; I(p) is the grayscale value of a neighboring pixel adjacent to the target pixel; p is a total number of the neighboring pixels; $(x_c, y_c)$ stands for the coordinate of the target pixel. Optionally, p=8.

Specifically, in one example, the method includes dividing a candidate image into a plurality of cells, optionally each of which includes at least 8 pixels. The grayscale value (or illuminance value) of a pixel is compared to eight neighboring pixels (upper-left, upper middle, upper right, left, right, lower-left, lower-middle, and lower-right). The s(x) in Equation (1) is a threshold function, when the pixel's value is greater than that of a neighbor's pixel, a "1" is assigned by the threshold function; otherwise a "0" is assigned by the threshold function. An eight-digit binary number is obtained as the LBP texture feature for the pixel. Optionally, a histogram of the frequency of each eight-digit binary number occurring is computed, and optionally normalized. The histograms (optionally normalized histograms) are concatenated to generate feature vectors of the cell.

In some embodiments, image features include color characteristic features. Optionally, the method includes first converting the image in an RGB space into an image in a HIS space, wherein H stands for hue feature, I stands for brightness feature, and S stands for saturation feature. The hue feature may be calculated according to Equation (2):

$$H = \begin{cases} \theta, & G \geq B \\ 2\pi - \theta, & G < B \end{cases}; \quad (2)$$

wherein $$\theta = \cos^{-1}\left(\frac{(R-G)+(R-B)}{2\sqrt{(R-G)^2 + (R-G)(G-B)}}\right),$$

R stands for red color grayscale, G stands for green color grayscale, and B stands for blue color grayscale.

In some embodiments, the saturation feature may be calculated according to Equation (3):

$$S = 1 - \frac{3\min(R, G, B)}{R+G+B}; \quad (3)$$

wherein R stands for red color grayscale, G stands for green color grayscale, and B stands for blue color grayscale.

In some embodiments, the brightness feature may be calculated according to Equation (4):

$$I = \frac{R+G+B}{3}; \quad (4)$$

wherein R stands for red color grayscale, G stands for green color grayscale, and B stands for blue color grayscale.

In some embodiments, a salient region in the image is detected based on a human visual attention model, and information regarding the salient region can then be obtained. Various appropriate salient region detection algorithm such as a frequency-tuned (FT) salient region detection algorithm may be used in detecting the salient region. Optionally, the salient region may be refined based on characteristics (e.g., shape) of an initially detected salient region. For example, the salient region may be refined based an aspect ratio of the initially detected salient region and/or a compactness of the shape of the initially detected salient region, to generate a refined salient region, which is then used in subsequent steps of the method.

In some embodiments, the salient region in the image is detected by a FT salient region detection algorithm. In one example, a Gaussian smoothing operation is first applied to the image. The method then includes converting the image in an RGB space into an image in a CIElab space. The CIElab color model compensates for the deficiencies of the RGB and CMYK color models. The CIElab color model is a device-independent color model based on physiological features. The CIElab color model consists of three elements, including an illuminance channel (L) and two color channels (a and b). The a channel corresponds to a color from dark green (low illuminance value) to gray (medium illuminance value) and to bright pink (high illuminance value). The b channel corresponds to a color from bright blue (low illuminance value) to gray (medium illuminance value) and to yellow (high illuminance value).

Specifically, the image in the RGB space is first converted into an image in a XYZ space based on Equation (5):

$$\begin{bmatrix} X \\ Y \\ Z \end{bmatrix} = M * \begin{bmatrix} R \\ G \\ B \end{bmatrix} \text{ wherein } M = \begin{bmatrix} 0.4124 & 0.3576 & 0.1805 \\ 0.2126 & 0.7152 & 0.0722 \\ 0.0193 & 0.1192 & 0.9505 \end{bmatrix}. \quad (5)$$

The image in the XYZ space is then converted into an image in a LAB space based on Equations (6)-(8):

$$L^* = 116 f(Y/Y_n) - 16; \quad (6)$$

$$a^* = 500[f(X/X_n) - f(Y/Y_n)]; \quad (7)$$

$$b^* = 200[f(Y/Y_n) - f(Z/Z_n)]; \quad (8)$$

$$\text{wherein } f(t) = \begin{cases} t^{1/3}, & t > \left(\frac{6}{29}\right)^3 \\ \frac{1}{3}\left(\frac{29}{6}\right)^2 t + \frac{4}{29}, & \text{otherwise} \end{cases}.$$

wherein $X_n=1$, $Y_n=1$, $Z_n=1$. For f (X/$X_n$), t stands for X/$X_n$. For f (Y/$Y_n$), t stands for Y/$Y_n$. For f (Z/$Z_n$), t stands for Z/$Z_n$. The f(t) is a threshold function, when t is greater than $(6/29)^3$, a "$t^{1/3}$" is assigned by the threshold function; otherwise $$"\frac{1}{3} * \left(\frac{29}{6}\right)^2 * t + \frac{4}{29}"$$

is assigned by the threshold function.

Optionally, a mean of the three channels L, a, and b of the image is calculated. Optionally, Euclidean distances between the mean of the three channels and L, a, b values of each pixel in the image is calculated, thereby obtain a plurality of salient maps. Optionally, the plurality of salient maps are normalized (e.g., scaled), followed by adaptive threshold segmentation to obtain a binary image of the salient region. The connected area in the binary image is extracted, thereby obtaining the salient region.

Based on a detected salient region, a salient region mask can be generated, as shown in FIG. 3. Accordingly, the image features in a region surrounded by the salient region mask may be obtained once the salient region mask is generated. In one example, the initially detected salient region is used for generating the salient region mask. In one example, the refined salient region is used for generating the salient region mask.

In some embodiments, subsequent to obtain the salient region mask, the method further includes performing feature combination on the image features of the region surrounded by the salient region mask to generate one-dimensional feature vectors. Optionally, the image features extracted from the image include features of a first type and features of a second type; and the step of performing feature combination on the image features includes combining a respective one of the features of the first type and a respective one of the features of the second type into a respective one of the one-dimensional feature vectors. Optionally, image features of more than two types may be combined into the one-dimensional feature vectors. In one example, the features of the first type are hue features, and the features of the second type are LBP texture features.

Figure 4A:
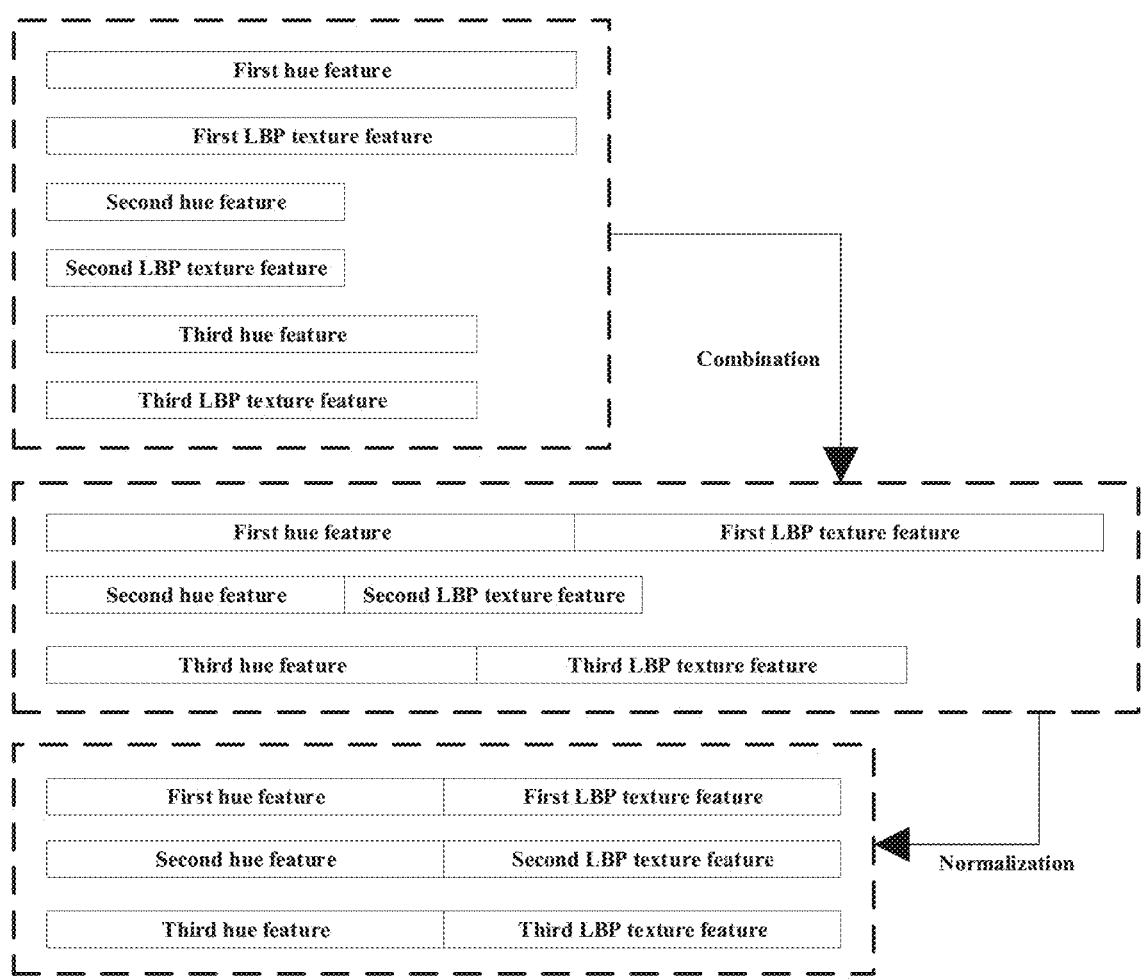
FIG. 4A illustrates an exemplary process of feature combination and feature vector length normalization.

In some embodiments, subsequent to feature combination, the method further includes performing feature vector length normalization on the one-dimensional feature vectors to generate normalized feature vectors. Optionally, the feature vector length normalization is a feature vector length scaling. The normalized (or optionally scaled) feature vectors (e.g., normalized one-dimensional feature vectors) are used as inputs to an image classifier for identifying a suspected foreign object in the image. Optionally, the image classifier is a pre-trained image classifier. FIG. 4A illustrates an exemplary process of feature combination and feature vector length normalization. As shown in FIG. 4A, in the process of feature vector length normalization, the hue components of the one-dimensional feature vectors are normalized with respect to each other, and the LBP texture features components of the one-dimensional feature vectors are normalized with respect to each other.

In one example, as shown in FIG. 4A, the feature combination process is performed prior to the feature vector length normalization process. Optionally, a respective one of the features of the first type and a respective one of the features of the second type are combined into a respective one of the one-dimensional feature vectors. The feature vector length normalization is then performed on the combined one-dimensional feature vectors. The hue components of the one-dimensional feature vectors are normalized with respect to each other, and the LBP texture features components of the one-dimensional feature vectors are normalized with respect to each other, thereby obtaining normalized one-dimensional feature vectors.

Figure 4B:
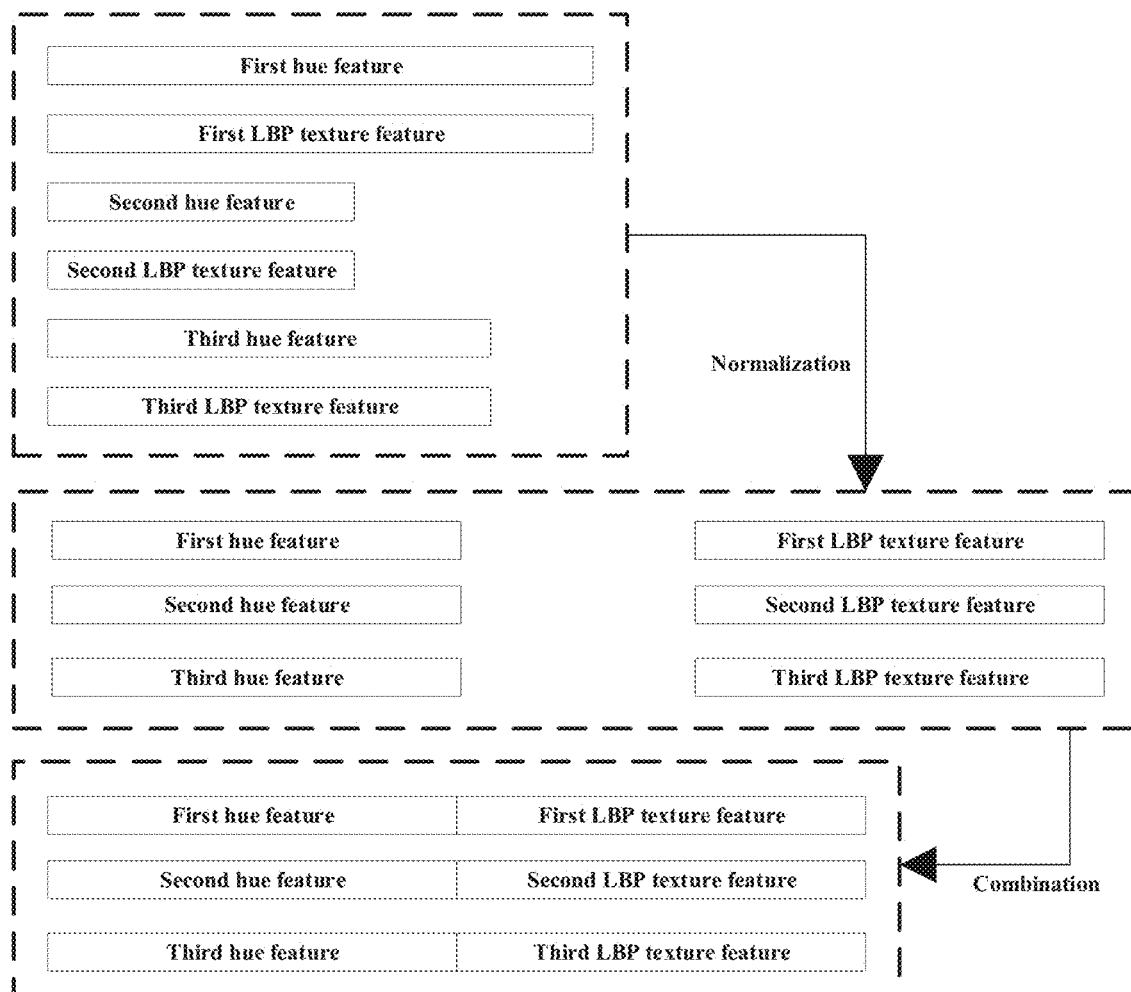
FIG. 4B illustrates an exemplary process of feature combination and feature vector length normalization.

FIG. 4B illustrates an exemplary process of feature combination and feature vector length normalization. In another example, and referring to FIG. 4B, the feature vector length normalization process is performed prior to the feature combination process. Optionally, the hue components of the one-dimensional feature vectors are normalized with respect to each other, and the LBP texture features components of the one-dimensional feature vectors are normalized with respect to each other. The respective one of the normalized features of the first type and a respective one of the normalized features of the second type are combined into a respective one of the one-dimensional feature vectors, thereby obtaining normalized one-dimensional feature vectors.

Optionally, the method further includes outputting a classification label corresponding to the suspected foreign object and a relative location of the suspected foreign object on the background object.

In some embodiments, the method further includes determining a color consistency of the region surrounded by the salient region mask. If it is determined that the color consistency of the region surrounded by the salient region mask is equal to or above a threshold color consistency value (indicating the color is sufficiently consistent), a classification label corresponding to the suspected foreign object and a relative location of the suspected foreign object on the background object are outputted.

If it is determined that the color consistency of the region surrounded by the salient region mask is below the threshold color consistency value (indicating the color is not sufficiently consistent), the method optionally further includes segmenting the salient region into a plurality of sub-regions; and determining a contour of a refined salient region based on results of segmenting the salient region into the plurality of sub-regions.

Optionally, the step of determining the color consistency includes calculating variance of hue features of the region surrounded by the salient region mask; and determining whether the variance of the hue features is greater than a first threshold value. The variance of the hue features being greater than the first threshold value indicates the color consistency of the region surrounded by the salient region mask being below a second threshold value. The variance of the hue features being equal to or less than the first threshold value indicates the color consistency of the region surrounded by the salient region mask is equal to or greater than the second threshold value.

Various appropriate segmentation algorithms may be used for segmenting the salient region into a plurality of sub-regions. In one example, a circumscribed rectangular frame of the salient region can be used as the initial boundary, and an interactive image segmentation algorithm (such as GrabCut) can be adopted to segment the salient region. In another example, an outer boundary of the connected region of the salient region can be used as the initial boundary, and an energy-based image segmentation algorithm (such as level set segmentation) can be adopted to segment the salient region.

Subsequently, the method further includes outputting a classification label corresponding to the suspected foreign object and a relative location of the suspected foreign object on the background object. Optionally, the method further includes outputting the refined salient region along with the classification label and the relative location.

Figure 5:
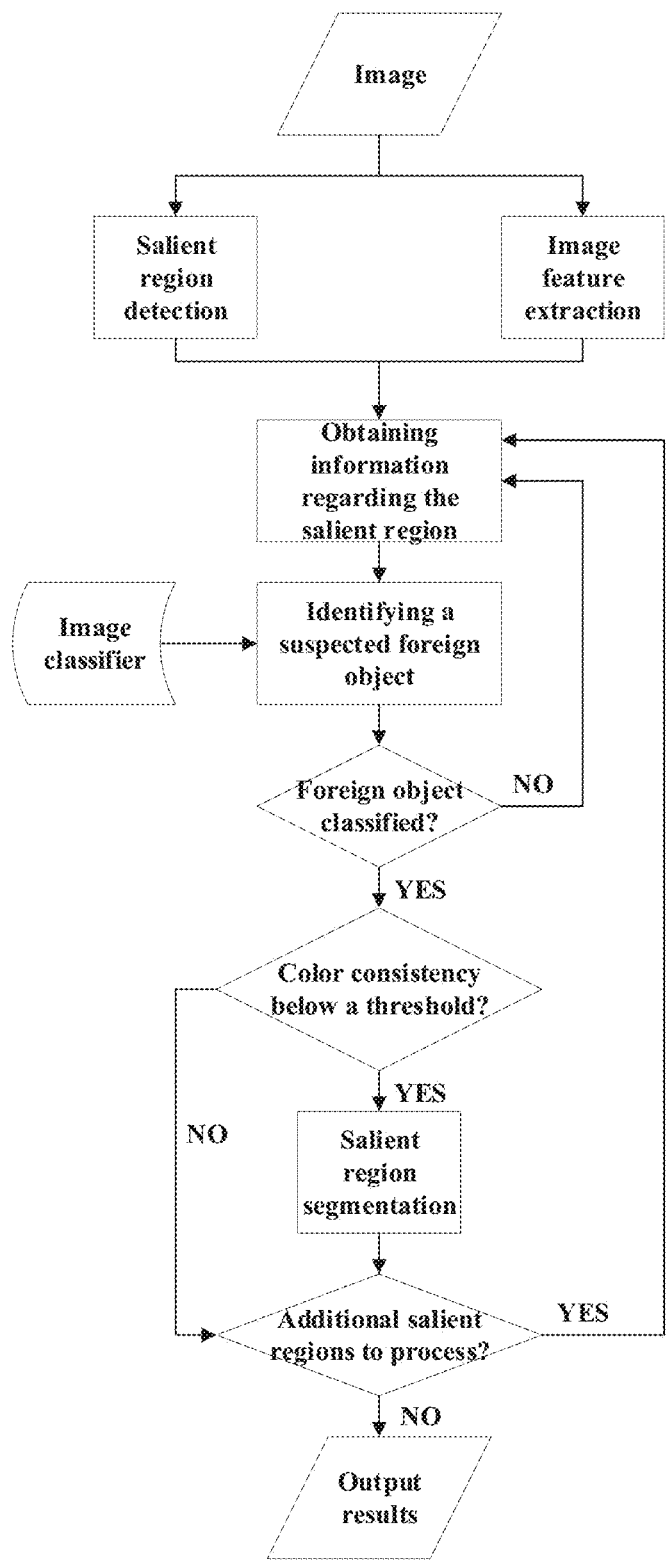
FIG. 5 is a flow chart illustrating a method of detecting a foreign object on a background object in an image in some embodiments according to the present disclosure.

The above-described processes may be reiterated for all salient regions detected in the image. FIG. 5 is a flow chart illustrating a method of detecting a foreign object on a background object in an image in some embodiments according to the present disclosure. FIG. 5 summarizes the processes described above. FIG. 6 is a flow chart illustrating a process of obtaining information regarding the salient region in some embodiments according to the present disclosure.

In some embodiments, the method further includes pre-training an initial image classifier to obtain the image classifier. Optionally, the step of pre-training the initial image classifier includes providing a training sample, a training classification label corresponding to the training sample, training image features corresponding to the training sample, and a training salient region mask corresponding to the training sample, the training image features including training features of a first type and training features of a second type; performing feature combination and feature vector length normalization on the training image features of the region surrounded by the training salient region mask to generate training normalized feature vectors; classifying the training sample based on the training normalized feature vectors to generate an initial classification label; determining a degree of match between the initial classification label and the training classification label; and tuning the initial image classifier based on the degree of match. In one example, the initial classification label does not match with the training classification label, the method includes tuning the initial image classifier, and reiterating the pre-training steps for one or more rounds, and determining the degree of match again until there is a match. The degree of match may be indicated in a scale of 0 to 10, for example. Optionally, the training sample can be manually selected. Optionally, the training classification label corresponding to the training sample may be manually provided. Optionally, the training classification label corresponding to the training sample may be automatically generated by a computer-implemented method. Various appropriate image classification algorithms such as a support vector machine (SVM) image classification algorithm may be used in pre-training the initial image classifier. Methods for feature combination and feature vector length normalization are discussed above in connection with the processes for classifying and detecting a foreign object on a background object in an image.

Optionally, performing feature combination and feature vector length normalization includes first performing feature combination on the training image features of the region surrounded by the training salient region mask to generate training one-dimensional feature vectors; followed by performing feature vector length normalization on the training one-dimensional feature vectors to generate the training normalized feature vectors (see, e.g., FIG. 4A). Optionally, performing feature combination and feature vector length normalization includes first performing feature vector length normalization on the training image features of the region surrounded by the training salient region mask to generate normalized training feature vectors; followed by performing feature combination on the normalized training feature vectors to generate the training normalized feature vectors (see, e.g., FIG. 4B).

In some embodiments, the step of pre-training the initial image classifier further includes providing a training image having a training foreign object on a training background object; extracting training image features of the training image based on image characteristics of the training background object and the training foreign object; detecting a training salient region in the training image based on the human visual attention model; generating the training salient region mask based on detection of the training salient region; and obtaining the training image features in a region surrounded by the training salient region mask. Optionally, the image features extracted from the image include features of a first type and features of a second type. Optionally, the features of the first type are hue features, and the features of the second type are LBP texture features. Methods for extracting the training image features, detecting the training salient region, generating the training salient region mask, and obtaining the training image features are discussed above in connection with the processes for classifying and detecting a foreign object on a background object in an image.

In another aspect, the present disclosure provides an apparatus for detecting a foreign object on a background object in an image. In some embodiments, the apparatus includes a memory; and one or more processors. The memory and the one or more processors are connected with each other. In some embodiments, the memory stores computer-executable instructions for controlling the one or more processors to extract image features of the image based on image characteristics of the background object and a suspected foreign object; detect a salient region in the image based on a human visual attention model; generate a salient region mask based on detection of the salient region; obtain the image features in a region surrounded by the salient region mask; perform feature combination and feature vector length normalization on the image features of the region surrounded by the salient region mask to generate normalized feature vectors; and identify the suspected foreign object using an image classifier, wherein the image classifier uses the normalized feature vectors as input for identifying the suspected foreign object. Optionally, the image features extracted from the image include features of a first type and features of a second type. Optionally, the memory stores computer-executable instructions for controlling the one or more processors to combine a respective one of the features of the first type and a respective one of the features of the second type into a respective one of the one-dimensional feature vectors. Optionally, the features of the first type are hue features, and the features of the second type are local binary pattern (LBP) texture features.

Optionally, performing feature combination and feature vector length normalization includes first performing feature combination on the training image features of the region surrounded by the training salient region mask to generate training one-dimensional feature vectors; followed by performing feature vector length normalization on the training one-dimensional feature vectors to generate the training normalized feature vectors. Optionally, performing feature combination and feature vector length normalization includes first performing feature vector length normalization on the training image features of the region surrounded by the training salient region mask to generate normalized training feature vectors; followed by performing feature combination on the normalized training feature vectors to generate the training normalized feature vectors.

As used herein, the term "processor" refers to a physical device that can perform computations. Examples of processors include a central processing unit (CPU), a microprocessor unit (MPU), a microcontroller unit (MCU), an application-specific instruction set processor (ASH)), a graphics processing unit (GPU), physics processing unit (PPU), a digital system processor (DSP), a reduced instruction set (RISC) processor, an image processor, a coprocessor, a floating-point unit, a network processor, a multi-core processor, a front-end processor, a field-programmable gate array (FPGA), a video processing unit, a vision processing unit, a tensor processing unit (TPU), a neural processing unit (NPU), a system on a chip (SOC), and others.

In some embodiments, the memory further stores computer-executable instructions for controlling the one or more processors to determine a color consistency of the region surrounded by the salient region mask. Optionally, the memory further stores computer-executable instructions for controlling the one or more processors to segment the salient region into a plurality of sub-regions, based on a determination that the color consistency of the region surrounded by the salient region mask is below a threshold value; and determine a contour of a refined salient region based on results of segmenting the salient region into the plurality of sub-regions. Optionally, for determining the color consistency of the region surrounded by the salient region mask, the memory further stores computer-executable instructions for controlling the one or more processors to calculate variance of hue features of the region surrounded by the salient region masks, and determine whether the variance of the hue features is greater than a first threshold value. Optionally, the variance of the hue features being greater than the first threshold value indicates the color consistency of the region surrounded by the salient region mask being below a second threshold value.

Optionally, the memory further stores computer-executable instructions for controlling the one or more processors to output a classification label corresponding to the suspected foreign object and a relative location of the suspected foreign object on the background object.

In some embodiments, the apparatus further includes an image capturing device configured to obtain the image having the foreign object on the background object.

In another aspect, the present disclosure provides a computer-program product including a non-transitory tangible computer-readable medium having computer-readable instructions thereon, the computer-readable instructions being executable by a processor to cause the processor to perform extracting image features of an image based on image characteristics of a background object and a suspected foreign object in the image; detecting a salient region in the image based on a human visual attention model; generating a salient region mask based on detection of the salient region; obtaining the image features in a region surrounded by the salient region mask; performing feature combination and feature vector length normalization on the image features of the region surrounded by the salient region mask to generate normalized feature vectors; and identifying the suspected foreign object using an image classifier, wherein the image classifier uses the normalized feature vectors as input for identifying the suspected foreign object. Optionally, the image features extracted from the image include features of a first type and features of a second type. Optionally, the computer-readable instructions are executable by a processor to cause the processor to perform combining a respective one of the features of the first type and a respective one of the features of the second type into a respective one of the one-dimensional feature vectors, thereby performing feature combination on the image features. Optionally, the features of the first type are hue features, and the features of the second type are local binary pattern (LBP) texture features.

Optionally, performing feature combination and feature vector length normalization includes first performing feature combination on the training image features of the region surrounded by the training salient region mask to generate training one-dimensional feature vectors; followed by performing feature vector length normalization on the training one-dimensional feature vectors to generate the training normalized feature vectors. Optionally, performing feature combination and feature vector length normalization includes first performing feature vector length normalization on the training image features of the region surrounded by the training salient region mask to generate normalized training feature vectors; followed by performing feature combination on the normalized training feature vectors to generate the training normalized feature vectors.

In some embodiments, the computer-readable instructions are executable by a processor to cause the processor to perform determining a color consistency of the region surrounded by the salient region mask. Optionally, the computer-readable instructions are executable by a processor to cause the processor to perform segmenting the salient region into a plurality of sub-regions, based on a determination that the color consistency of the region surrounded by the salient region mask is below a threshold value; and determining a contour of a refined salient region based on results of segmenting the salient region into the plurality of sub-regions. Optionally, for determining the color consistency, the computer-readable instructions are executable by a processor to cause the processor to perform calculating variance of hue features of the region surrounded by the salient region mask; and determining whether the variance of the hue features is greater than a first threshold value. Optionally, the variance of the hue features being greater than the first threshold value indicates the color consistency of the region surrounded by the salient region mask being below a second threshold value.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method of detecting a foreign object on a background object in an image, comprising:
   extracting image features of the image based on image characteristics of the background object and a suspected foreign object;
   detecting a salient region in the image based on a human visual attention model;
   generating a salient region mask based on detection of the salient region;
   obtaining the image features in a region surrounded by the salient region mask;
   performing feature combination and feature vector length normalization on the image features of the region surrounded by the salient region mask to generate normalized feature vectors;
   identifying the suspected foreign object using an image classifier, wherein the image classifier uses the normalized feature vectors as input for identifying the suspected foreign object; and
   determining a color consistency of the region surrounded by the salient region mask;
   wherein determining the color consistency comprises:
   calculating variance of hue features of the region surrounded by the salient region mask; and
   determining whether the variance of the hue features is greater than a first threshold value;
   wherein the variance of the hue features being greater than the first threshold value indicates the color consistency of the region surrounded by the salient region mask being below a second threshold value.

2. The computer-implemented method of claim 1, further comprising pre-training an initial image classifier to obtain the image classifier;
   wherein pre-training the initial image classifier comprises:
   providing a training sample, a training classification label corresponding to the training sample, training image features corresponding to the training sample, and a training salient region mask corresponding to the training sample, the training image features comprising training features of a first type and training features of a second type;
   performing feature combination and feature vector length normalization on the training image features of a region surrounded by the training salient region mask to generate training normalized feature vectors;
   classifying the training sample based on the training normalized feature vectors to generate an initial classification label;
   determining a degree of match between the initial classification label and the training classification label; and
   tuning the initial image classifier based on the degree of match.

3. The computer-implemented method of claim 1, further comprising outputting a classification label corresponding to the suspected foreign object and a relative location of the suspected foreign object on the background object.

4. The computer-implemented method of claim 1, wherein the background object is a photovoltaic panel.

5. The computer-implemented method of claim 1, further comprising segmenting the salient region into a plurality of sub-regions, based on a determination that the color consistency of the region surrounded by the salient region mask is below a threshold value; and
   determining a contour of a refined salient region based on results of segmenting the salient region into the plurality of sub-regions.

6. The computer-implemented method of claim 1, wherein the image features extracted from the image comprise features of a first type and features of a second type;
   performing feature combination on the image features comprises combining a respective one of the features of the first type and a respective one of the features of the second type into a respective one of one-dimensional feature vectors.

7. The computer-implemented method of claim 6, wherein the features of the first type are hue features, and the features of the second type are local binary pattern (LBP) texture features.

8. An apparatus for detecting a foreign object on a background object in an image, comprising:
   a memory; and one or more processors;
wherein the memory and the one or more processors are connected with each other; and
the memory stores computer-executable instructions for controlling the one or more processors to:
extract image features of the image based on image characteristics of the background object and a suspected foreign object;
detect a salient region in the image based on a human visual attention model;
generate a salient region mask based on detection of the salient region;
obtain the image features in a region surrounded by the salient region mask;
perform feature combination and feature vector length normalization on the image features of the region surrounded by the salient region mask to generate normalized feature vectors;
identify the suspected foreign object using an image classifier, wherein the image classifier uses the normalized feature vectors as input for identifying the suspected foreign object; and
determine a color consistency of the region surrounded by the salient region mask;
calculate variance of hue features of the region surrounded by the salient region mask; and
determine whether the variance of the hue features is greater than a first threshold value;
wherein the variance of the hue features being greater than the first threshold value indicates the color consistency of the region surrounded by the salient region mask being below a second threshold value.

9. The apparatus of claim 8, wherein the memory further stores computer-executable instructions for controlling the one or more processors to segment the salient region into a plurality of sub-regions, based on a determination that the color consistency of the region surrounded by the salient region mask is below a threshold value; and
determine a contour of a refined salient region based on results of segmenting the salient region into the plurality of sub-regions.

10. The apparatus of claim 8, wherein the memory further stores computer-executable instructions for controlling the one or more processors to output a classification label corresponding to the suspected foreign object and a relative location of the suspected foreign object on the background object.

11. The apparatus of claim 8, wherein the background object is a photovoltaic panel.

12. The apparatus of claim 8, further comprising an image capturing device configured to obtain the image having the foreign object on the background object.

13. The apparatus of claim 8, wherein the image features extracted from the image comprise features of a first type and features of a second type;
wherein the memory stores computer-executable instructions for controlling the one or more processors to combine a respective one of the features of the first type and a respective one of the features of the second type into a respective one of one-dimensional feature vectors.

14. The apparatus of claim 13, wherein the features of the first type are hue features, and the features of the second type are local binary pattern (LBP) texture features.

15. A computer-program product comprising a non-transitory tangible computer-readable medium having computer-readable instructions thereon, the computer-readable instructions being executable by a processor to cause the processor to perform:
extracting image features of an image based on image characteristics of a background object and a suspected foreign object in the image;
detecting a salient region in the image based on a human visual attention model;
generating a salient region mask based on detection of the salient region;
obtaining the image features in a region surrounded by the salient region mask;
performing feature combination and feature vector length normalization on the image features of the region surrounded by the salient region mask to generate normalized feature vectors;
identifying the suspected foreign object using an image classifier, wherein the image classifier uses the normalized feature vectors as input for identifying the suspected foreign object; and
determining a color consistency of the region surrounded by the salient region mask;
wherein determining the color consistency comprises:
calculating variance of hue features of the region surrounded by the salient region mask; and
determining whether the variance of the hue features is greater than a first threshold value;
wherein the variance of the hue features being greater than the first threshold value indicates the color consistency of the region surrounded by the salient region mask being below a second threshold value.

16. A computer-implemented method of detecting a foreign object on a background object in an image, comprising:
extracting image features of the image based on image characteristics of the background object and a suspected foreign object;
detecting a salient region in the image based on a human visual attention model;
generating a salient region mask based on detection of the salient region;
obtaining the image features in a region surrounded by the salient region mask;
performing feature combination and feature vector length normalization on the image features of the region surrounded by the salient region mask to generate normalized feature vectors;
identifying the suspected foreign object using an image classifier, wherein the image classifier uses the normalized feature vectors as input for identifying the suspected foreign object; and
pre-training an initial image classifier to obtain the image classifier;
wherein pre-training the initial image classifier comprises:
providing a training sample, a training classification label corresponding to the training sample, training image features corresponding to the training sample, and a training salient region mask corresponding to the training sample, the training image features comprising training features of a first type and training features of a second type;
performing feature combination and feature vector length normalization on the training image features of a region surrounded by the training salient region mask to generate training normalized feature vectors;

classifying the training sample based on the training normalized feature vectors to generate an initial classification label;
determining a degree of match between the initial classification label and the training classification label;
tuning the initial image classifier based on the degree of match;
providing the training image having a training foreign object on a training background object;
extracting training image features of the training image based on image characteristics of the training background object and the training foreign object;
detecting a training salient region in the training image based on the human visual attention model;
generating the training salient region mask based on detection of the training salient region; and
obtaining the training image features in a region surrounded by the training salient region mask.

* * * * *